United States Patent [19]

Foster et al.

[11] 3,849,190
[45] Nov. 19, 1974

[54] DIELECTRIC GLASS OVERLAYS AND METHOD FOR PRODUCING SAID GLASS COMPOSITIONS

[75] Inventors: Betty J. Foster; Rao R. Tummala, both of Wappingers Falls, N.Y.

[73] Assignee: International Business Machines Corporation, Armonk, N.Y.

[22] Filed: Apr. 20, 1973

[21] Appl. No.: 353,051

[52] U.S. Cl.............. 117/219, 29/25.11, 29/625, 117/23, 117/25, 117/29, 117/169 R, 117/223, 313/188
[51] Int. Cl......... H01j 9/00, B44d 1/09, B44d 1/14
[58] Field of Search..... 117/23, 25, 29, 223, 169 R, 117/219; 313/182, 190, 188; 29/25.11, 625

[56] References Cited
UNITED STATES PATENTS

| | | | |
|---|---|---|---|
| 2,877,144 | 3/1959 | Iversen | 117/223 |
| 3,039,888 | 6/1962 | Sejournet et al. | 117/23 |
| 3,384,508 | 5/1968 | Bopp et al. | 117/23 |
| 3,484,266 | 12/1969 | Nelson | 117/23 |
| 3,666,981 | 5/1972 | Lay | 313/190 |
| 3,716,742 | 2/1973 | Nakayama et al. | 313/182 |
| 3,788,874 | 1/1974 | Crandall et al. | 117/29 |

Primary Examiner—Michael Sofocleous
Attorney, Agent, or Firm—Wesley DeBruin; Daniel E. Igo

[57] ABSTRACT

A method for the production of dielectric glass compositions useful in a gas panel or plasma display device apparatus is disclosed. The method comprises providing a supported glass substrate and sequentially depositing thereon firstly a glass frit of appropriate particle size having compatible thermal expansion properties with said glass substrate and capable of forming into clear substantially bubble-free films at a temperature equal to or less than 620°C. Secondly, depositing thereon a layer of glass frit having a viscosity higher than said first deposited glass frit, having a maximum softening temperature of 620°C, followed by firing said deposited composite frit layers to a temperature of approximately 620°C in an atmosphere of nitrogen, air or oxygen.

13 Claims, 2 Drawing Figures

DIELECTRIC GLASS OVERLAYS AND METHOD FOR PRODUCING SAID GLASS COMPOSITIONS

CROSS-REFERENCE TO RELATED APPLICATIONS

U.S. Pat. application Ser. No. 176,625, "Dielectric Insulator for Gaseous Discharge Device" by P. H. Haberland, et. al., filed Aug. 31, 1971 and abandoned Sept. 27, 1973.

U.S. Pat. application Ser. No. 176,626, "Improved Dielectric Insulator for Gaseous Discharge Device" by P. H. Haberland and J. J. Hall, filed Aug. 31, 1971 and abandoned Dec. 10, 1973.

U.S. Pat. application Ser. No. 886,100, "Gas Cell Type Memory Panel with Grid Network for Electrostatic Isolation," by Frank M. Lay filed Dec. 18, 1969, granted as U.S. Pat. No. 3,666,981 on May 20, 1972. U.S. Pat. application Ser. No. 885,086 "Improved Method and Apparatus for a Gas Display Panel" by Tony N. Criscimagna, et al. filed Dec. 15, 1969, abandoned and continuation U.S. Pat. application Ser. No. 268,219 filed June 23, 1972. Ser. No. 268,219 abandoned and continuation U.S. Pat. application Ser. No. 372,384 filed June 21, 1973. Ser. No. 372,384 is now pending.

U.S. Pat. application Ser. No. 353,026, "Glass Fabrication Process" by M. Berkenblit, R. O. Lussow and A. Reisman, filed Apr. 20, 1973.

BACKGROUND OF THE INVENTION

1. Field of the Invention

The present invention relates to a method for the production of multi-layered glass systems suitable for use in the fabrication and operation of gas panel or plasma display apparatus.

2. Description of the Prior Art

One of the deterrents encountered in the manufacturing of glass parts stems from the fact that the temperature requirements for different steps may be so different or diverse as to be destructive of prior fabricated or assembled units. Similarly, the exposure of certain glass compositions to plasma or glow discharge tends to deteriorate the dielectric glass which results in low life and inadequate reliability of the resulting gas display apparatus. This latter difficulty has been alleviated in certain cases by overcoating the dielectric glass deposited on the display cells with a coating of magnesium oxide which is in turn exposed to the glow discharge atmosphere. In apparatus of this nature, it has been found that subsequent fabrication or sealing of the display device tends to distort the dielectric glass which in turn cracks or crazes the magnesium oxide protective overcoating, all of which destroys complete fabrication of a useful gas display unit.

One obvious approach employed heretofore to solve the particular problem of damage caused by the relatively high temperatures involved in fusing and sealing glass articles, is to endeavor to find low melting sealants. Such an approach is employed, for example, by J. Francel, et al. in U.S. Pat. No. 3,127,278, entitled "Low-Melting Glass Sealant and Article Made Therefrom." Typical of other low melting glass for use as a frit (a powder), soldering material, sealant, and the like, are those described by K. Ikeda, et al., in U.S. Pat. No. 3,420,683 and No. 3,425,817. Likewise, F. Veres describes, in U.S. Pat. No. 3,645,839, a low temperature glass sealant containing aluminum titanate. However, as will be explained more fully hereinafter, the low melting sealant approach is not always successful, where sealing temperature creates the problem.

Although a number of low temperature sealant glasses are available, these tend to crystallize to such an extent as to create problems relating to the gap between plates. In addition, such sealants can be deposited in a frit paste or slurry requiring the use of organic carriers which can not be completely removed at low sealing temperatures. In accordance with this invention, these problems are eliminated by the use of preformed glass rods which flow into vitreous seals at about 480°C and therefore avoid contamination and allow for gap control.

It should be noted in this regard, that the problem of damage to glass parts due to relatively high temperatures is not necessarily limited to sealing operations required in glass tubes and the like, but may be prevalent in any of a variety of fabrication operations involving glass systems. For example, it is evident that glasses employed for encapsulation must, in general, be relatively low melting glasses, for otherwise damages to previously formed parts might occur during their flow out operation. Likewise, when one glass layer is deposited upon another, the temperature required for flowing out the former on the latter must be, in general, below the deformation or reflow temperature of the latter, where deformation or reflow must be considered in the context of a time-temperature dependent phenomenon.

It should be understood here that in the fabrication of devices involving glass systems, a certain amount of softening or reflow in previously formed glass parts therein undergoing some form of temperature processing does not necessarily pose a problem. The degree of softening or reflow which is tolerable in a particular glass part undergoing some form of temperature processing depends upon the nature and function of the part, and how such softening or reflow affects other parts associated therewith. For purposes of description, "reflow" as used herein is intended to mean any "softening," "reflow," "excessive reflow," "melting," etc., that is undesirable or intolerable by way of being deleterious to device integrity such as to affect device operation, performance, reliability, life, etc. Typically, reflow, that causes even minimal deformation or distortion of previously formed glass parts is, in a great number of present day applications, intolerable, particularly as pertains to applications involving electronics. It should be noted that glasses typically will reflow and deform at any temperature above the anneal temperature. In this regard, it should also be noted that reflow in glass may occur at any temperature during which the time-temperature cycle involved provides sufficient heat to cause a discernably deleterious change in the glass part being processed.

In fabricating electronic apparatus having composite structures of glass layers, or glass, metal and crystalline layers, for example, it is clear that it is necessary, in general, that the hierarchy of successive different layers achieve sufficiently low viscosities so as to enable flow out to take place at succeedingly lower temperatures, such that as the fabrication steps progress, lower and lower temperatures are required therefor. In particular, as each successive layer of the composite structure is fabricated, it must soften and flow out at a lower temperature than that of any of the previously applied layers. The necessity of this declining flow out temperature hierarchy most often limits design choice. Also limiting design choice is the fact that the magnitude of the co-efficient of thermal expansion of each of the successive layers must be compatibly close. However, it is obvious that the above conditions must generally prevail in order to maintain practical structural integrity.

The problem of damage to prefabricated glass parts due to the heat required to carry out fabrication of composite structures is compounded by the fact that design considerations may, at times, require the use of a glass in such structures that deforms at temperatures at or below the temperatures required for subsequent steps in the process. Typically, such subsequent processing steps may involve a sealing operation. As previously mentioned, although various efforts have been made to obtain relatively low temperature sealants, where an unusually low temperature glass is necessary at some point in the fabrication of particular apparatus, it may not be possible to obtain a sealant exhibiting a sufficiently low sealing temperature such that deformation or reflow of the low temperature glass is avoided.

Likewise, design considerations may at times require a structure to be made having a considerable number of layers of glass. Since each successively fabricated layer of glass must normally be produced at a temperature lower than the deformation or reflow temperatures of the glasses employed in fabricating the underlying glass layers thereof, it is clear that a final sealing step, for example, may be required by the glass hierarchy to be made at a temperature lower than the sealing temperature of available sealants.

Accordingly, it is clear that the application temperature of available low-temperature sealants may at times not be sufficiently low so as to be compatible with the rest of the structure involved with the sealing operation. For example, one approach to the fabrication of a.c. gas panel display devices requires that a dielectric glass with a relatively low flow out temperature be fabricated in layer form upon both plates of a pair of conventional relatively low softening point glass plates, having an array of conductors deposited thereon. Typically, commercially available plate glass from LOF (Libby-Owens-Ford) or ASG (American Saint Gobain) are employed for the substrate plate. Thereafter, a thin layer of metal oxide, such as MgO, is deposited upon the glass dielectric layer. As one of the final steps in the fabrication process, the pair of glass plates are sealed together to form a gas tight chamber. However, difficulty has been encountered during the sealing process. Available low-melting glass sealants require a temperature which is, by comparison, high enough to cause some reflow of the previously flowed on glass dielectric layer. The reflow of the glass dielectric layer causes crazing of the overlying thin layer of metal oxide (such as MgO) and in addition reacts with it. This crazing is intolerable for device performance.

Not only does the device performance require that the above mentioned crazing be avoided but, in addition, to retain structural integrity it is required that, in accordance with practical design constraints, the coefficient of thermal expansion of the various parts of the glass system involved therein vary only slightly from one part to another. However, to devise a glass system wherein the coefficients of thermal expansion of the various parts are compatible with one another and yet, wherein each successive fabrication step is performed at a temperature sufficiently low so as to not reflow or deform previously formed parts, is quite difficult with the normally available selection of materials.

In regard to the latter, one would normally generally expect in fabricating glass systems, that mixtures of glasses from the normally available selection of materials, in the range of compositions tried, typically would show crystalline or non-crystalline phase separation. In addition, in such mixtures it is to be expected that the properties of the resulting glass are unpredictable. Accordingly, in addition to showing discontinuities at phase boundaries, it can be expected that relatively large and unpredictable variations in the coefficients of thermal expansion and viscosity may exist.

Thus, whether the fabrication problems confronted in glass systems are incident to the fabrication of a.c. gas panel display devices, or any of the variety of electronic apparatus and the like which use glass systems, the problems, to a large degree, are the same.

SUMMARY OF THE INVENTION

This invention provides the method for avoiding the adverse affects resulting from temperature differentials encountered in the multi-step processes for manufacturing glass systems, especially those used in gas panel display devices and the like.

The method described herein accomplishes this result by sequentially depositing layers of different glass frit having different softening temperatures and viscosities so that upon firing or raising the frit layers to the maximum tolerable temperature, the frit of the higher softening temperature and viscosity glass diffuses into the lower softening temperature and viscosity glass thereby producing a composite having a diffused interface between the resultant layers whereby a clear and substantially bubble-free dielectric film is produced capable of being utilized in gas panel, glow discharge, and similar display apparatus.

More particularly, in accordance with the present invention, when applied to the manufacture of gas display panels, a suitable glass substrate is provided and supported by an appropriate base or resting means, said substrate containing an array of display cells over which a clear dielectric glass is deposited. The glass deposition is accomplished in accordance with this invention by first depositing a layer of glass frit flow softening glass containing a suitable carrying liquid followed by laying down a second layer of glass frit having a higher softening temperature and viscosity all of which are subjected to a temperature suitable for evaporating the carrying or liquid slurry whereupon the composite layers are fired to a maximum temperature of 620°C in an atmosphere of nitrogen, air or oxygen whereby a composite is formed having an integrally diffused interface of two distinct glass compositions.

It must be understood that in the manufacture of gas display panels, it is desirable for economic reasons to utilize soda lime silica glass substrates whereupon metal conductors such as chrome-copper-chrome systems are embedded to produce an array of display cells. The display cells are then covered by a dielectric glass film usually in the neighborhood of approximately two mils thick. It has been found that the dielectric glass where especially a lead glass is used is subject to deterioration when exposed to the glow discharge atmosphere and temperature resulting from the application of the necessary power. Consequently, it has been found desirous to protect the dielectric glass film by overlaying a layer of magnesium oxide which must be maintained intact through subsequent process heat cycling. The MgO overlay is generally in the neighborhood of 2,000A thick.

It is therefore an object of the present invention to provide an improved method for fabricating glass parts.

It is still a further object of this invention to provide a method for the deposition of different glass frits to produce a resulting composite having a diffused integral interface and softening or distortion temperatures which are above the temperatures utilized in subsequent process steps.

It is still a further object of this invention to provide a method for depositing a dielectric glass film in the manufacture of gas display panels whereby the subsequent deposition of magnesium oxide overlay will not be disrupted by subsequent heat cycling process steps.

The foregoing and other objects, features and advantages of the invention will be apparent from the following more particular description of preferred embodiments of the invention as described in conjunction with the accompanying drawings.

DESCRIPTION OF THE PREFERRED EMBODIMENTS

Figure 1:
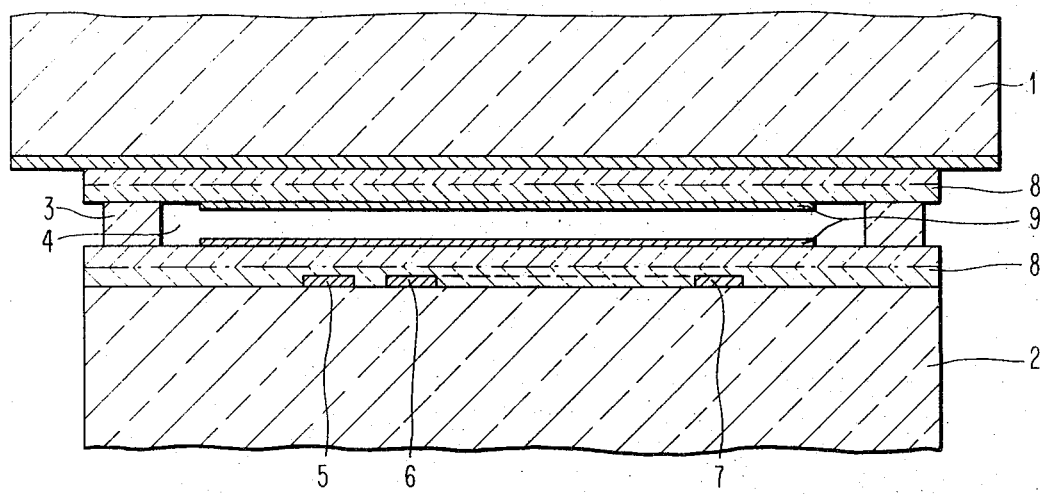
FIG. 1 is a cross-sectional view of a typical gas discharge display arrangement.

Referring to the drawings, FIG. 1 is representative of a typical gas panel display device suitable for the application of the method described herein. Initially, an assembly of glass plates 1 and 2 are provided. These glass plates are known as substrate plates and are usually formed of soda lime silica glass which consists of approximately 14 percent soda ($Na_2O$), 10 percent lime ($CaO$), and 75 percent silica ($SiO_2$). The remaining being impurities or incidental amounts of other elements. This glass is often referred to as SLS and is readily available on the market as ordinary window glass. Although this type of glass is illustrated herein, any suitable SLS substrate may be used. The glass substrate plates are soldered or sealed together in a fixed, spaced apart relationship by a continuous glass rod illustrated at 3. It is obvious that the welded glass rod must provide a good hermetic seal for the cavity of gas space formed between the pair of plates as shown in FIG. 1.

Prior to sealing of the plates 1 and 2 together, each plate is provided with or on its inner surface an array of generally parallel conductors so that when the plates are sealed together one array will generally be orthogonal to the other. On plate 2 in FIG. 1, these conductors are indicated by 5, 6 and 7. As indicated by the dash line between the conductors 6 and 7, any suitable number of conductors may be deposited thereon consistent with the practical design of the display unit. In this regard, it is clear that the number of lines employed in each of the arrays will be determined by the number of addressable glow discharge sites or cells desired to be made available in the x–y matrix arrangement thereof. In regard to the metal conductors 5, 6 and 7, any variety of metals or alloys may be employed as such. For example, copper coated both top and bottom with chromium may provide a satisfactory metallization arrangement to be used for these conductors. Although the width and the thickness dimensions of the conductors are not critical, conductors from 1 to 3 microns thick have been found satisfactory. Likewise, any variety of conventional processes may be employed to fabricate the conductor arrays, such as photo-etching, vacuum deposition, stencil screening, and the like.

For a more detailed description of gas panel conductor arrays and the dielectric used to cover the same, reference can be made to co-pending U.S. Pat. application Ser. No. 311,022 entitled "Gas Discharge Panel Structure" by A. Reisman, filed Nov. 30, 1972 and assigned to the assignee of the present invention.

In the normal process of fabricating the display device illustrated in FIG. 1 prior to the sealing step, a glass dielectric layer is flowed out or otherwise provided in accordance with the method described herein over the array of conductors on each of the glass substrates. Therefore, as shown in FIG. 1, dielectric layer 8 is initially provided to cover the operative surface area of the conductors 5, 6 and 7 shown on plate 2. A similar dielectric layer is provided with respect to conductors on plate 1. The dielectric layers provided in these display devices may be, for example, 1 or 2 mils thick. Similarly, where the substrate glass 1 and 2 comprises the conventionally relatively soft plate glass or as referred to previously conventional soda lime silica glass, the composite dielectric layer may be a lead glass such as lead borosilicate glass, or a composite layer of a lead glass and a glass having a higher softening point and viscosity as described in this specification.

In order to achieve effective gas panel operation, the dielectric layers 8 are each covered with a thin refractory overcoat layer 9, for example, a metal oxide having a high ion induced secondary electron emission coefficient so as to thereby permit lower operating voltages. Typical of such a dielectric overcoat arrangement is that described in the above referenced co-pending U.S. Pat. application Ser. No. 311,022. However, in the preferred arrangement, metal oxide overcoat layers 9 of FIG. 1 comprise a thin layer of MgO, since this material has been found to be particularly suitable for such purpose. Particularly, the MgO layers may be approximately 2,000A thick.

After the array of conductors on each of the plates 1 and 2 have been covered with a layer of dielectric 8 and the latter covered with a layer of MgO 9, for example, the plates are then arranged to be sealed together by sealing glass bead 3 so that the spacing between the two MgO layers on the upper and lower cell walls is typically about 4 mils.

In regard to the sealing step, any variety of low temperature sealants may be employed for this purpose. However, the sealant selected must obviously be capable of providing both a strong and permanent hermetic seal and a mechanically rugged weld between the glass plates. As can be seen, the seal is made directly between the dielectric layers. After the sealed cavity housing the arrays of conductors have been evacuated as previously mentioned, it is baked to remove contaminants and filled with any of a variety of ionizable gases capable of supporting a glow discharge. For example, a mixture of neon and 0.10 percent of argon may be inserted after evacuation to an operating pressure of 300 to 550 torr.

Although the operation of a.c. gas panel display devices is well known to those skilled in the art, it is not a part of the present invention. It should be mentioned in brief, that the normal mode of operation, $x$-select and $y$-select drive circuit means are coupled respectively to the arrays of conductors carried on plates 1 and 2. Thus, the conductors may be coupled to a $x$-select circuit arrangement and the conductors of the opposite plate may be coupled to a $y$-select circuit arrangement. Voltages are applied to the $x$ and $y$ plates such that the sum of the two voltages is insufficient to cause a spontaneous discharge to occur in the gas. However, the sum of the two voltages is of such value that when additional voltage pulse is applied, the sum of the original $x$ and $y$ voltage (known as a sustained voltage) plus the additional voltage (known as a write voltage) is sufficient even after the removal of the additional write voltage to cause the discharge to be sustained merely by the continued application of lower half-select voltages. The minimum voltages that must be applied to the $x$ and $y$ lines which will enable a discharge to be sustained after the application and removal of a write voltage is termed a minimum sustain voltage. The maximum voltages that may be impressed upon the $x$ and $y$ lines such that upon the application of an erase voltage of opposite polarity will result in the extinguishing of a discharge is termed the maximum sustain voltage. In operation, the sum of the voltages impressed upon the $x$ and $y$ electrodes lies between the minimum and maximum sustain voltages.

It is obvious from the foregoing that the manufacture of gas display panels exhibits critical or significant process limitations. Firstly, that the firing temperature of the dielectric in relation to the softening temperature of the substrate; secondly, the substrate must be appropriately supported in the manufacture of the conductors, the dielectric deposition and the protective oxide overlay. Thirdly, the nature of the sealant material and the sealing temperature in relation to the critical temperatures of the dielectric and the glass substrate are also important.

When soda lime silica substrate glass is employed, a maximum dielectric glass firing temperature of between 595°C and 620°C becomes apparent when the substrate during dielectric deposition is supported on a non-glassing support such as a ceramic material having a flatless deviation of less than 0.1 mil. Although the maximum firing temperature of SLS glasses is about 550°C corresponding to the annealing temperature, appropriate supporting means described above allows higher firing temperature while utilizing such SLS glasses.

It is apparent in view of the foregoing that any single dielectric glass firing or working temperature less than 620°C will craze the MgO overlay at the required sealing temperature of about 480°C.

Likewise, it is believed that MgO crazing or cracking takes place at a temperature equal to or corresponding to the log viscosity 10.3 poises of the dielectric glass. Therefore, with a maximum dielectric firing temperature of 620°C as limited by the substrate, soda lime silica glass, it is necessary to have a dielectric glass composition and method which will exhibit a crazing temperature equal to or greater than 480°C.

It was found that suitable dielectric films can be deposited by first providing a glass composition exhibiting compatible thermal expansion characteristics with a substrate soda lime silica glass and which normally flows into the films below 620°C and spraying or otherwise depositing a layer of this glass powder having a particle size between 1 and 5 microns upon the substrate to a thickness of about 1 mil. Normally, glasses of this nature are sprayed utilizing an organic carrying or dispersing liquid such as amyl-acetate or nitrocellulose in the ratio of 60 percent solids to 40 percent carrying liquids. Superimposed or sequentially deposited over the first layer is a second layer of a glass having a higher viscosity and a maximum softening temperature of 620°C, and a minimum softening temperature of 550°C.

Figure 2:
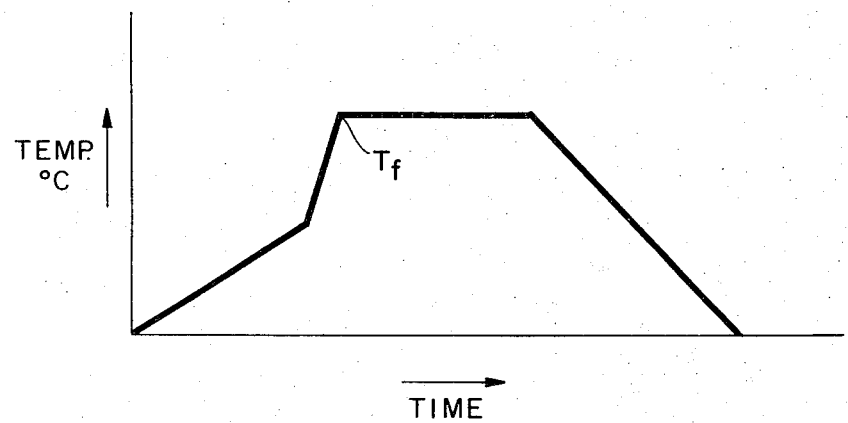
FIG. 2 is a plot of the heating cycle utilized in carrying out the method in accordance with the present invention.

The composite deposited slurry is dried at a temperature between 125°C to 200°C during which the slurry liquid is evaporated, after which the powdered glass or frit is fired to approximately 500°C at a rate of 0.5° per minute and then to a maximum of 620°C at a rate of 1° per minute and held at the 620°C temperature for approximately 2 hours after which the composite is cooled at the rate of 1° per minute to 500°C and then at the rate of 1.5° per minute to room temperature. This firing or working temperature cycle is illustrated graphically by FIG. 2 of the drawings. The firing should be undertaken in an atmosphere of either nitrogen, air or oxygen. This method produces a dielectric glass which will support the aforesaid MgO protective coating that will withstand ultimate gas panel sealing at about 480°C without cracking or crazing the MgO overlay. The following specific examples more definitely illustrate the invention defined herein and although these examples are utilized for illustrative purposes, the invention disclosed is not limited thereto.

Utilizing preformed substrates having metal conductive paths previously described and suitable for fabrication into a gas panel structure, the following glass compositions in weight percent were slurried and utilized to form the bottom or first layer of glass upon said substrate prior to firing.

|  | A | B | C |
|---|---|---|---|
| PbO | 73.5 | 70 | 72 |
| $B_2O_3$ | 12.7 | 15 | 6.5 |
| $SiO_2$ | 13.6 | 9 | 17 |
| $Al_2O_3$ | 0.2 | 6 | 4.5 |
| Softening Temperature | 477°C | 479°C | 494°C |
| Annealing Temperature | 405°C | 407°C | 415°C |

Likewise, the following glass compositions were slurried and deposited upon the first layer to form the prefired composite.

|  | A | B | C |
|---|---|---|---|
| $SiO_2$ | 55 | 10 | 56 |
| $Na_2O$ | 6 | 10 | 0 |
| $K_2O$ | 3 |  | 0 |
| $B_2O_3$ | 25 | 50 | 26 |
| $Al_2O_3$ | 1 | 20 | 2 |
| BaO | 4 | 5 | 5 |

-Continued

|  | A | B | C |
|---|---|---|---|
| CaO | 1 | 0 | 0 |
| Li₂O | 5 | 0 | 11 |
| TiO₂ | 0 | 5 | 0 |
| Softening Temperature | 607°C | 577°C | 619°C |
| Annealing Temperature | 496°C | 487°C | 489°C |

Combinations of the above compositions were processed as illustrated below to produce composite dielectric layers having integrally diffused interfaces and producing substantially bubble-free, clear films having 2,000A MgO overlay.

| Top Glass Slurry | Top Glass Slurry Thickness (Mils) | Bottom Glass Slurry | Bottom Glass Slurry Thickness (Mils) | Firing Temp. | Firing Atmos. | MgO Craze Temperature |
|---|---|---|---|---|---|---|
| A | 0.5 | A | 0.5 | 610°C | N₂ | 487°C |
| A | 1.0 | A | 0.5 | 615°C | air | 497°C |
| A | 0.5 | B | 1.0 | 610°C | air | 482°C |
| A | 0.5 | B | 0.5 | 610°C | N₂ | 490°C |
| A | 0.5 | C | 0.5 | 610°C | O₂ |  |
| B | 0.5 | A | 1.0 | 600°C | N₂ | 474°C |
| B | 0.5 | A | 0.5 | 615°C | air | 480°C |
| C | 0.5 | A | 1.0 | 590°C | air | 480°C |

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. In a method for fabricating a gas panel display cell array structure having at least one glass substrate having a planar surface with electrically conductive metal contacts thereon and a dielectric composite glass material overlying said planar surface and said electrically conductive metal contacts, and
   wherein the improvement in said method comprises the following steps in the order recited:
   a. coating said planar surface of said glass substrate with said electrically conductive metal contacts thereon with a first slurry containing an organic dispersion medium and a first glass frit;
   b. coating said planar surface of said glass substrate with said electrically conductive metal contacts thereon and coated with said first slurry containing said first glass frit with a second slurry containing an organic dispersion medium and a second glass frit where said second glass frit has a higher softening temperture and viscosity than said first glass frit;
   c. gradually heating said coatings in an atmosphere selected from the group consisting of nitrogen, oxygen and air to a temperature approximately equal to the softening temperature of said glass substrate to evaporate said organic dispersion mediums thereby forming dry coatings;
   d. maintaining said coatings at said temperature approximately equal to the softening temperature of said glass substrate for a time interval to form a composite having an integrally diffused interface of two distinct glass compositions; and
   e. gradually cooling said coatings to room temperature.

2. In a method for fabricating a gas panel display cell array structure in accordance with claim 1 wherein said glass substrate is a soda lime silica glass.

3. In a method for fabricating a gas panel display cell array structure in accordance with claim 1 wherein said first glass frit is a lead glass and said second glass frit is a non-lead glass.

4. In a method for fabricating a gas panel display cell array structure in accordance with claim 1 wherein said first and second glass frits are respectively lead glasses.

5. In a method for fabricating a gas panel display cell array structure in accordance with claim 1 wherein said glass substrate is a soda lime silicon glass having approximately 14 percent by weight Na₂O, 10 percent by weight CaO, and 75 percent by weight SiO₂.

6. In a method for fabricating a gas panel display cell array wherein the improvement in said method comprises the following steps in the order recited:
   a. forming a soda lime silica glass substrate having at least one planar surface;
   b. forming an electrically conductive thin metal pattern on said planar surface;
   c. depositing a first layer of a slurry containing an organic dispersion medium and a first lead glass frit on said planar surface containing said electrically conductive thin metal pattern;
   d. depositing a second layer of a slurry containing an organic dispersion medium and a second glass frit on said first layer, and where said second glass frit has a higher softening temperature and viscosity than said first glass frit;
   e. gradually heating said layers in an atmosphere selected from the group consisting of nitrogen, oxygen and air to a temperature of between 595°C and 620°C to evaporate said organic dispersion mediums thereby forming dry coatings;
   f. maintaining said layers at said temperature for a period of one-half to 2 hours to form a composite having an integrally diffused interface of two distinct glass compositions;
   g. and, gradually cooling said layers to room temperature.

7. In a method for fabricating a gas panel display cell array in accordance with claim 6 wherein said deposited layers containing glass frits are first heated to dryness, followed by heating to about 500°C at a rate of 1.5°C per minute, followed by heating to 615°C at a rate of 1°C per minute, followed by holding at said temperature of 615°C for a period of approximately 2 hours, and followed by cooling at reverse rates to room temperature.

8. In a glass panel display cell array structure, a soda lime silica glass substrate having at least one planar surface and electrically conductive metal contacts on said planar surface of said substrate, wherein the improvement comprises: a dielectric glass overlay said contacts and said planar surface of said glass substrate, said dielectric glass overlay comprising first and second glass compositions having a diffused interface, said first glass composition consisting essentially of any one of the compositions A, B and C, as set forth in the following table:

|  | Composition A in weight per cent | Composition B in weight per cent | Composition C in weight per cent |
| --- | --- | --- | --- |
| PbO | 73.5 | 70 | 72 |
| $B_2O_3$ | 12.7 | 15 | 6.5 |
| $SiO_2$ | 13.6 | 9 | 17 |
| $Al_2O_3$ | 0.2 | 6 | 4.5 | said seccond glass composition consisting essentially of any one of the compositions D, E and F as set forth in the following table:

|  | Composition D in weight per cent | Composition E in weight per cent | Composition F in weight per cent |
| --- | --- | --- | --- |
| $SiO_2$ | 55 | 10 | 56 |
| $Na_2O$ | 6 | 10 | 0 |
| $K_2O$ | 3 | 0 | 0 |
| $B_2O_3$ | 25 | 50 | 26 |
| $Al_2O_3$ | 1 | 20 | 2 |
| BaO | 4 | 5 | 5 |
| CaO | 1 | 0 | 0 |
| $Li_2O$ | 5 | 0 | 11 |
| $Ti_2O$ | 0 | 5 | 0 |

9. In a gas panel display cell array structure in accordance with claim 8 wherein a protective alkaline earth metal overlay overlies said dielectric glass overlay.

10. In a gas panel display cell array structure in accordance with claim 9 wherein a said protective earth metal overlay is magnesium oxide.

11. In a gas panel display cell array structure as recited in claim 8 wherein said first glass composition consists essentially of one or more of the compositions A, B and C as recited in claim 8, and said second glass compositions consists essentially of one or more of the compositions D, E and F as recited in claim 8.

12. In a method for fabricating a gas panel display cell array wherein the improvement in said method comprises the following steps in the order recited:

a. forming a soda lime silica glass substrate having at least one planar surface;

b. forming electrically conductive metal contacts on said planar surface;

c. coating said planar surface having said metal contacts thereon with a slurry containing an organic dispersion medium and a first glass frit composition consisting essentially of any one of the compositions A, B or C as set forth in the following Table:

|  | Composition A in weight per cent | Composition B in weight per cent | Composition C in weight per cent |
| --- | --- | --- | --- |
| PbO | 73.5 | 70 | 72 |
| $B_2O_3$ | 12.7 | 15 | 6.5 |
| $SiO_2$ | 13.6 | 9 | 17 |
| $Al_2O_3$ | 0.2 | 6 | 4.5 | d. coating said planar surface having said metal contacts thereon with a slurry containing an organic dispersion medium and a second glass frit composition consisting essentially of any one of the compositions D, E or F as set-forth in the following Table:

|  | Composition D in weight per cent | Composition E in weight per cent | Composition F in weight per cent |
| --- | --- | --- | --- |
| $SiO_1$ | 55 | 10 | 56 |
| $Na_2O$ | 6 | 10 | 0 |
| $K_2O$ | 3 | 0 | 0 |
| $B_2O_3$ | 25 | 50 | 26 |
| $Al_2O_3$ | 1 | 20 | 2 |
| BaO | 4 | 5 | 5 |
| CaO | 1 | 0 | 0 |
| $Li_2O$ | 5 | 0 | 11 |
| $TiO_2$ | 0 | 5 | 0 | e. gradually heating said coatings in an atmosphere selected from the group consisting of nitrogen, oxygen and air to a temperature approximately equal to the softening temperature of said glass substrate to evaporate said organic dispersion mediums thereby forming dry coatings;

f. maintaining said coatings at said temperature approximately equal to the softening temperature of said glass substrate for a time interval to form a composite having an integrally diffused interface of two distinct glass compositions; and g. gradually cooling said coatings to room temperature.

13. In a method for fabricating a gas panel display cell array in accordance with claim 12 wherein said first glass frit composition consists essentially of one or more of the compositions A, B and C as recited in claim 12, and said second glass frit composition consists essentially of one or more of the compositions D, E and F as recited in claim 12.

* * * * *